United States Patent [19]

Hiraoka et al.

[11] Patent Number: 5,215,308
[45] Date of Patent: Jun. 1, 1993

[54] SOLID GOLF BALL
[75] Inventors: Hidenori Hiraoka, Kobe; Akihiko Hamada, Kakogawa, both of Japan
[73] Assignee: Sumitomo Rubber Industries, Ltd., Kobe, Japan
[21] Appl. No.: 724,770
[22] Filed: Jul. 2, 1991
[30] Foreign Application Priority Data Jul. 13, 1990 [JP] Japan .................................. 2-186289

[51] Int. Cl.5 .......................... A63B 37/00; C08L 9/00
[52] U.S. Cl. ........................... 273/218; 273/DIG. 10;
525/315; 525/236; 525/237; 525/193; 524/483;
524/908; 260/998.14
[58] Field of Search ................. 525/315; 524/483, 908;
260/998.14; 273/218

[56] References Cited
U.S. PATENT DOCUMENTS

| | | | |
|---|---|---|---|
| 2,638,460 | 5/1953 | Crouch | 524/483 |
| 2,721,185 | 10/1955 | Schulze | 524/483 |
| 2,877,200 | 3/1959 | Carpenter | 525/315 |
| 3,240,844 | 3/1966 | Gruner | 525/315 |
| 3,281,389 | 10/1966 | Hirshfield | 525/237 |
| 3,919,133 | 11/1975 | Dawans et al. | 525/237 |
| 4,683,257 | 7/1987 | Kakiuchi et al. | 524/432 |
| 4,770,422 | 9/1988 | Isaac | 524/908 |
| 4,974,852 | 12/1990 | Hiraaka | 524/908 |
| 5,096,201 | 3/1992 | Egashira et al. | 524/908 |

FOREIGN PATENT DOCUMENTS

| | | | |
|---|---|---|---|
| 546253 | 9/1985 | Australia . | |
| 684622 | 4/1964 | Canada | 525/315 |
| 60-094434 | 7/1985 | Japan . | |
| 60-182969 | 8/1985 | Japan . | |
| 61-196980 | 10/1986 | Japan . | |
| 2139101 | 11/1984 | United Kingdom . | |

OTHER PUBLICATIONS

*Science and Technology of Rubber* published by Academic Press 1978 Under the auspices of the Rubber Division on the American Chemical Society Chapter 7, Vulcanization.

Primary Examiner—Carman J. Seccuro, Jr.

[57] ABSTRACT

Disclosed is a solid golf ball containing at least one rubber portion formed from a rubber composition comprising a base rubber, a co-crosslinking agent and an organic peroxide; an improvement being present in that the base rubber is a mixture of
(A) a solid polybutadiene rubber containing cis-1,4 bonds in an amount of at least 40%, and
(B) either a liquid polybutadiene rubber or a liquid isoprene-butadiene copolymer rubber, or both.

8 Claims, No Drawings

SOLID GOLF BALL

FIELD OF THE INVENTION

The present invention relates to a golf ball, particularly a one-piece solid golf ball.

BACKGROUND OF THE INVENTION

Golf balls are classified into two types. One is thread wound golf balls which comprise a thread wound core and a cover covering the core, and the other is solid golf balls, e.g. one-piece solid golf balls which are integrally composed of rubber and two solid golf balls which are composed of a rubber core and a cover thereon.

The solid golf balls contain at least one rubber portion. The rubber portion has been prepared from a rubber composition which mainly contains as base rubber butadiene rubber or a mixture of butadiene rubber and the other rubber (e.g. natural rubber and isoprene rubber). The base rubbers, however, have some problems in processability (for example, mixing process or extruding process), thus resulting in poor production efficiency. These problems are more serious when a polybutadiene having high Mooney viscosity or narrow molecular weight distribution is used to improve the physical properties of golf balls.

SUMMARY OF THE INVENTION

The inventors have found that a rubber composition containing as a base rubber a mixture of a solid polybutadiene rubber and a specific liquid polybutadiene rubber significantly improves the processability and surprisingly enhances the physical properties of the resulting solid golf balls (e.g. durability, impact resilience, hit feeling and the like). Accordingly the present invention is directed to a solid golf ball containing at least one rubber portion formed from a rubber composition comprising a base rubber, a co-crosslinking agent and an organic peroxide; an improvement being present in that the base rubber is a mixture of (A) a solid polybutadiene rubber containing cis-1,4 bonds in an amount of at least 40%, and (B) either a liquid polybutadiene rubber or a liquid isoprene-butadiene copolymer rubber, or both.

DETAILED DESCRIPTION OF THE INVENTION

The polybutadiene rubber (A) employed in the present invention is solid at room temperature and contains cis-1,4-bonds in an amount of at least 40%, preferably at least 80%. If the content of the cis-1,4 bonds is less than 40%, impact resilience is poor. Among the solid polybutadiene rubber (A), it is preferred that the solid polybutadiene rubber (A) has a high Mooney viscosity or a narrow or sharp molecular weight distribution, especially a Mooney viscosity ($ML_{1+4}$ 100° C.) of 45 to 90 or a ratio of weight average molecular weight/number average molecular weight (Mw/Mn) of 4.0 or less. The preferred solid polybutadiene (A) exhibits superior technical effects when combined with the liquid rubber component (B). The polybutadiene (A) is commercially available in the tradenames of Ubepole BR 150 L or Ubepole BR 360L (both Ube Industries, Ltd.), BUNA CB 22 or BUNA CB 10 (both Bayer AG) and the like.

The rubber component (B) employed in the present invention is either a liquid polybutadiene rubber or a liquid isoprene-butadiene copolymer rubber, or both. The term "liquid" means that the rubber is flowable at room temperature. The liquid rubber component (B) preferably has a number average molecular weight of 1,000 to 50,000. Molecular weights outside the range deteriorate compression and impact resilience of the resulting golf balls or have poor processability. The liquid isoprene-butadiene copolymer rubber preferably contains at least 50 % by weight of the butadiene component. If the isoprene component is more than 50 % by weight, crosslinking efficiency is poor and the physical properties of the obtained rubber are poor. The rubber component (B) is commercially available, for example the liquid polybutadiene is available from Nippon Oil Co., Ltd. as Nisseki Polybutadiene B-3000 and the liquid isoprene-butadiene copolymer rubber is available from Kuraray Co., Ltd. as Kuraprene LIR-390.

In the base rubber, it is preferred that a weight ratio of the polybutadiene component (A) / the liquid rubber component (B) is within the range of 98/2 to 75/25, more preferably 95/5 to 80/20. If the liquid rubber component (B) is less than 2 parts, the technical effects of the present invention are not attained. If it is more than 25 parts, the obtained rubber composition is sticky and adversely makes processability poor.

The base rubber of the present invention is mainly composed of the above mentioned two rubber components (A) and (B), but other diene rubbers, such as EPDM, styrenebutadiene rubber, polyisoprene rubber, natural rubber and the like may be added thereto if necessary. The other diene rubber may be present in the base rubber in an amount of 40 % by weight or less.

The co-crosslinking agent of the present invention can be unsaturated carboxylic acids or metal salts thereof. Examples of the unsaturated carboxylic acids and metal salts thereof are acrylic acid, methacrylic acid, and divalent metal salts thereof (e.g. zinc salts), and mixtures thereof. An amount of the co-crosslinking agent is within the range of 15 to 60 parts by weight based on 100 parts by weight of the base rubber.

The organic peroxide of the present invention can be anyone which is used in this field as polymerization initiator, including dicumyl peroxide, 1,1-bis(t-butylperoxy)-3, 3,5-trimethylcyclohexane, 2,5-dimethyl-2,5-di(t-butylperoxy)hexane, di-t-butylperoxide and the like. Preferred is dicumyl peroxide. The organic peroxide may be present in the rubber composition in an amount of 0.3 to 3.0 parts by weight, preferably 1.0 to 2.5 parts by weight based on 100 parts by weight of the base rubber.

The rubber composition of the present invention may further contain fillers to control the specific gravity of the resulting golf balls. Typical examples of the fillers are zinc oxide, barium sulfate, calcium carbonate silicate hydrate and the like. The rubber composition also contains antioxidants, chain transfer agents, stabilizers and the like to enhance the performances of the resulting golf balls.

The rubber composition of the present invention can be prepared by mixing the above mentioned components, using a roll, a kneader, a Banbury mixer and the like. Mixing temperature and time are known in the art.

The solid golf balls of the present invention may be obtained by vulcanizing the rubber composition in a mold and optionally covering it with a cover material (e.g. ionomer resin). Vulcanization may be generally conducted at a temperature of 140° to 180° C. for 15 to 55 minutes.

The rubber composition of the present invention can be easily processed or treated by mixing the polybutadiene rubber with the specific liquid rubber component (B). It is surprisingly that the golf balls obtained from the rubber composition have excellent impact durability and hit feeling.

EXAMPLES

The present invention is illustrated by the following Examples which, however, are not to be construed as limiting the present invention to their details.

EXAMPLES 1-7 and COMPARATIVE EXAMPLES 1 and 2

A rubber composition was prepared from the ingredients shown in Table 1, using a kneader and a roller, and then vulcanized in a mold at 168° C. for 25 minutes to obtain a one-piece solid golf ball. The processability of the rubber composition was determined and the result is shown in Table 1.

The resulting golf ball was subjected to a measurement of physical properties (ball weight, compression, impact durability and hit feeling) and the results are shown in Table 1.

peroxide; an improvement being present in that said base rubber is a mixture of
- (A) a solid polybutadiene rubber containing cis-1,4 bonds in an amount of at least 40%, and having a Mooney viscosity ($ML_{1+4}$ 100° C.) of 45 to 90 and a ratio of weight average molecular weight/number average molecular weight (Mx/Mn) of 4.0 or less; and
- (B) either a liquid polybutadiene rubber or a liquid isoprene-butadiene copolymer rubber, or both.

2. The solid golf ball according to claim 1 wherein said liquid rubber component (B) has a number average molecular weight of 1,000 to 50,000.

3. The solid golf ball according to claim 1 wherein said liquid rubber component (B) does not have carboxyl groups at the terminals of the molecule.

4. The solid golf ball according to claim 1 wherein a weight ratio of polybutadiene component (A)/liquid rubber component (B) is within the range of 98/2 to 72/25.

5. The solid golf ball according to claim 1 wherein said co-crosslinking agent is acrylic acid, methacrylic acid or a divalent metal salt thereof.

6. The solid golf ball according to claim 1 wherein an

TABLE 1

| | Examples | | | | | | | Comp. Ex. | |
|---|---|---|---|---|---|---|---|---|---|
| | 1 | 2 | 3 | 4 | 5 | 6 | 7 | 1 | 2 |
| Rubber composition (parts by weight) | | | | | | | | | |
| Ubepol BR 150L*[1] | 98 | 90 | 80 | 90 | 80 | — | — | 100 | — |
| Ubepol BR 360L*[2] | — | — | — | — | — | 90 | 80 | — | 100 |
| Kuraprene LIR-390*[3] | 2 | 10 | 20 | — | — | 10 | 20 | — | — |
| Nisseki Polybutadiene B-3000*[4] | — | — | — | 10 | 20 | — | — | — | — |
| Zinc oxide | 25 | 25 | 25 | 25 | 25 | 25 | 25 | 25 | 25 |
| Methacrylic acid | 25 | 25 | 25 | 25 | 25 | 25 | 25 | 25 | 25 |
| Dicumyl peroxide | 1.0 | 1.0 | 1.0 | 1.0 | 1.0 | 1.0 | 1.0 | 1.0 | 1.0 |
| Antioxidant | 0.15 | 0.15 | 0.15 | 0.15 | 0.15 | 0.15 | 0.15 | 0.15 | 0.15 |
| Processability*[5] | Good | Very good | Very good | Very good | Very good | Very good | Very good | Poor | Poor |
| Ball weight (g) | 45.3 | 45.3 | 45.2 | 45.3 | 45.2 | 45.3 | 45.2 | 45.4 | 45.4 |
| Compression*[6] | 100 | 101 | 100 | 98 | 97 | 102 | 101 | 100 | 101 |
| Impact durability*[7] | 109 | 120 | 130 | 131 | 142 | 125 | 135 | 100 | 105 |
| Hit feeling*[8] | Normal | Good | Good | Good | Good | Good | Good | Normal | Normal |

*[1]High cis-polybutadiene rubber having a Mooney viscosity ($ML_{1+4}$100° C.) of 43, a molecular weight distribution (Mw/Mn) of 2.8, a cis-1,4-bond of about 95% and a number average molecular weight of 210,000, available from Ube Industries, Ltd.
*[2]High cis-polybutadiene rubber having a Mooney viscosity ($ML_{1+4}$100° C.) of 50, a molecular weight distribution (Mw/Mn) of 2.7, a cis-1,4-bond of about 95% and a number average molecular weight of 250,000, available from Ube Industries Ltd.
*[3]Isoprene-butadiene copolymer liquid rubber having a number average molecular weight of 35,000, and a butadiene content of 80% by weight, available from Kuraray Co., Ltd.
*[4]Liquid polybutadiene rubber having a number average molecular weight of 3,000, available from Nippon Oil Co., Ltd.
*[5]Processability was evaluated with roll winding condition, dispersibility of components, stock surface condition after rolling and stock surface condition after rubber-extruding
Very good: all items (i.e. roll winding condition, dispersibility of components, stock surface condition after rolling and stock surface condition after rubber-extruding) is good.
Good; Roll winding condition, dispersibility of components and stock surface condition after rolling are good, but stock surface is slightly rough after rubber-extruding.
Poor; Roll winding condition is very poor when a rubber temperature is elevated. The surface after rubber extruding is like pine cones even if it is extruded at low speed.
*[6]Compression is determined by PGA rules. It is expressed as an index when Comparative Example 1 is set 100. The larger the harder.
*[7]A golf ball is repeatedly struck with an impact panel at a speed of 45 m/s until the ball was broken out. Number of strikes is expressed as an index when that of Comparative Example 1 is 100. The larger the more durable.
*[8]An average of hit feeling with drivers of two men professional golfers, one woman professional golfer and three top amateur golfers with a handicap of 3 to 8.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A solid golf ball containing at least one rubber portion formed from a rubber composition comprising a base rubber, a co-crosslinking agent and an organic amount of the co-crosslinking agent is within in the range of 15 to 60 parts by weight based on 100 parts by weight of the base rubber.

7. The solid golf ball according to claim 1 wherein said organic peroxide includes dicumyl peroxide, 1,1-bis(t-butylperoxy)-3,3,5-trimethylcyclohexane, 2,5-dimethyl-2, 5-di(t-butylperoxy)hexane or di-t-butylperoxide.

8. The solid golf ball according to claim 1 wherein said organic peroxide is present in the rubber composition in an amount of 0.3 to 3.0 parts by weight based on 100 parts by weight of the base rubber.

* * * * *